United States Patent
Shaffstall et al.

(10) Patent No.: US 8,727,298 B2
(45) Date of Patent: May 20, 2014

(54) OFFROAD WHIP MOUNT

(71) Applicants: Steven J. Shaffstall, Trabuco Canyon, CA (US); Scott D. Shaffstall, Trabuco Canyon, CA (US)

(72) Inventors: Steven J. Shaffstall, Trabuco Canyon, CA (US); Scott D. Shaffstall, Trabuco Canyon, CA (US)

(*) Notice: Subject to any disclaimer, the term of this patent is extended or adjusted under 35 U.S.C. 154(b) by 0 days.

(21) Appl. No.: 13/917,234

(22) Filed: Jun. 13, 2013

(65) Prior Publication Data
US 2013/0284877 A1 Oct. 31, 2013

Related U.S. Application Data

(63) Continuation of application No. 12/760,404, filed on Apr. 14, 2010, now abandoned.

(60) Provisional application No. 61/216,041, filed on May 13, 2009.

(51) Int. Cl.
*A01K 97/10* (2006.01)

(52) U.S. Cl.
USPC .......... 248/540; 248/68.1; 248/519; 248/74.4

(58) Field of Classification Search
CPC ...... A01K 97/10; H01Q 1/1221; E04H 12/32; F16M 13/02
USPC ......... 248/540, 541, 68.1, 208, 65, 74.4, 519, 248/521, 523, 527, 535, 539, 514, 538
See application file for complete search history.

(56) References Cited

U.S. PATENT DOCUMENTS

| | | | | |
|---|---|---|---|---|
| 1,015,717 | A * | 1/1912 | Shimer | 248/514 |
| 1,198,840 | A * | 9/1916 | Hank | 248/534 |
| 1,404,777 | A * | 1/1922 | Leutner | 248/512 |
| 2,970,798 | A * | 2/1961 | Friotchle et al. | 248/229.25 |
| 3,162,407 | A * | 12/1964 | Yax | 248/514 |
| 3,179,144 | A | 4/1965 | Brown | |
| 3,305,253 | A | 2/1967 | Kopich | |
| 3,724,791 | A * | 4/1973 | Mason | 248/514 |
| 3,856,244 | A * | 12/1974 | Menshen | 248/67.5 |
| 4,593,877 | A * | 6/1986 | van der Wyk | 248/512 |
| 4,865,287 | A * | 9/1989 | Stoudt | 248/513 |
| H001012 | H * | 1/1992 | Senatro | 248/68.1 |
| 5,113,717 | A * | 5/1992 | Plamper | 74/502.6 |
| 5,233,881 | A | 8/1993 | Sayen et al. | |
| 5,438,789 | A * | 8/1995 | Emory | 43/21.2 |
| 5,472,166 | A | 12/1995 | Wear | |
| 5,483,772 | A * | 1/1996 | Haddock | 52/25 |
| 5,895,024 | A * | 4/1999 | Williams et al. | 248/513 |
| 6,010,107 | A * | 1/2000 | Goldfarb | 248/512 |
| 6,138,978 | A * | 10/2000 | Andersen | 248/534 |
| 6,267,425 | B1 * | 7/2001 | Dorsey | 294/143 |
| 6,276,651 | B1 | 8/2001 | Dolan | |

(Continued)

*Primary Examiner* — Terrell McKinnon
*Assistant Examiner* — Monica Millner
(74) *Attorney, Agent, or Firm* — Stetina Brunda Garred & Brucker

(57) ABSTRACT

An offroad whip mount as disclosed includes a mounting element that may be secured to a standard mounting location on any suitable vehicle. A closure plate is secured to the mounting element using a tongue, sized and dimensioned to engage a corresponding groove in the mounting element and the closure plate is secured to the mounting element with a threaded fastener. The mounting element and the closure plate each have two corresponding half-cylindrical grooves that form two independent whip receptacles. The engaging tongue and groove combined with the threaded fastener serve to clamp one or two whips into the whip mount.

11 Claims, 4 Drawing Sheets

(56) References Cited

U.S. PATENT DOCUMENTS

| | | |
|---|---|---|
| 6,295,945 B1 | 10/2001 | Amanze |
| 6,402,116 B1 * | 6/2002 | Northup ........................ 248/514 |
| 6,495,441 B2 | 12/2002 | Kitajima et al. |
| 6,726,170 B2 | 4/2004 | Luo |
| 6,811,132 B1 | 11/2004 | Ferdinand et al. |
| 6,898,893 B1 * | 5/2005 | Mukdaprakorn ............... 43/21.2 |
| 6,962,018 B1 * | 11/2005 | King .............................. 43/21.2 |
| 6,988,701 B1 | 1/2006 | Lin |
| 7,007,900 B2 * | 3/2006 | Goodwin et al. ............ 248/68.1 |
| 7,201,442 B1 * | 4/2007 | Decosta, Jr. et al. ..... 297/184.16 |
| 7,789,352 B2 * | 9/2010 | Darling, III .................. 248/74.4 |
| 7,789,369 B2 * | 9/2010 | Jahnz ............................ 248/540 |
| 7,887,012 B2 * | 2/2011 | Desai et al. ..................... 248/55 |
| 2007/0246614 A1 * | 10/2007 | Allmann et al. ................. 248/65 |
| 2007/0252071 A1 | 11/2007 | Huang |
| 2008/0084590 A1 | 4/2008 | Mack |
| 2008/0155872 A1 | 7/2008 | Brengman |

\* cited by examiner

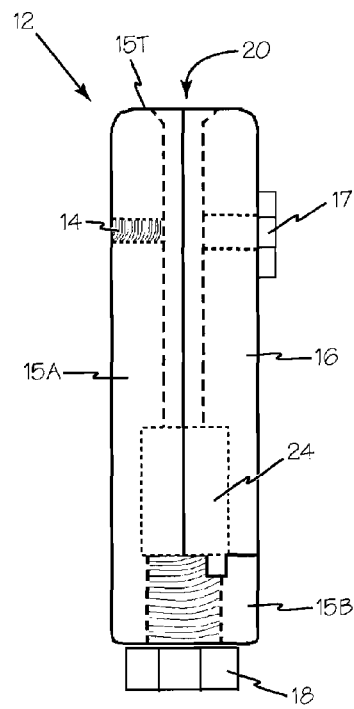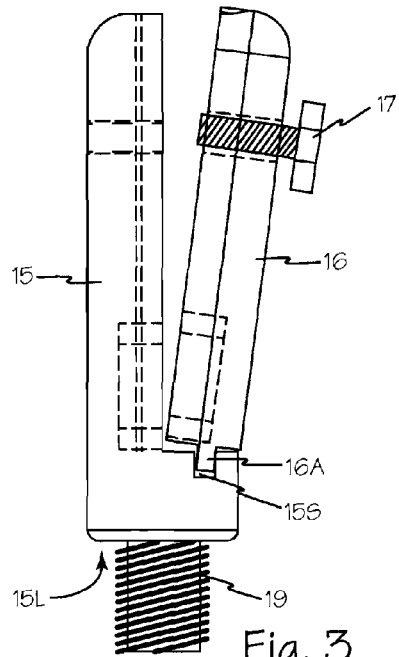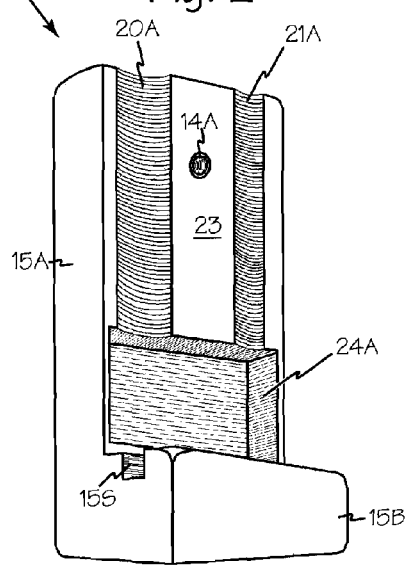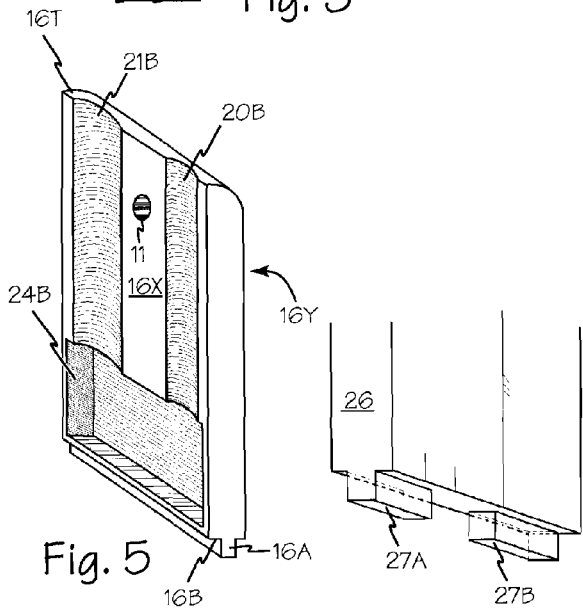
Fig. 2
Fig. 3
Fig. 4
Fig. 5
Fig. 5A

OFFROAD WHIP MOUNT

CROSS-REFERENCE TO RELATED APPLICATIONS

This application is a continuation of U.S. patent application Ser. No. 12/760,404, entitled OFFROAD WHIP MOUNT, filed on Apr. 14, 2010 which claims priority to U.S. Provisional Patent Application 61/216,041 filed May 13, 2009, the teachings of all of which are incorporated herein by reference.

STATEMENT RE: FEDERALLY SPONSORED RESEARCH/DEVELOPMENT

Not Applicable

FIELD OF THE INVENTION

The inventions described below relate to the field of accessories for off highway motorsports and more specifically to the field of whip mounts for off highway motorsports.

BACKGROUND

In off-road or off highway areas throughout the United States, any person riding or driving an off highway vehicle (OHV), including all-terrain vehicles (ATVS) and motorcycles, must mount a safety flag on a flexible whip to the OHV when in use. Safety flags provide a necessary safety feature, allowing pedestrians, emergency personnel, and other riders to locate an ATV and rider more easily and avoid collisions or other incidents.

ATV safety flag whips are often made of fiberglass and vary in size, but two diameters commonly used are ¼ inch and 5/16 inch. ATV safety flag whips are often mounted by forcing the bottom or butt end of the fiberglass whip into a bored out ½ inch bolt, which then mounts in a ½ inch diameter receptacle usually found on a vehicle's rear bumper or grab bar and is further secured by a ½ inch nut.

As often happens with off highway use or accidents, these whips break. Being made of fiberglass, a break is never clean. The broken ends of the whip are frayed, to one degree or another, often in dozens or even hundreds of razor-sharp and hair-thin shards protruding from the broken sections.

In order to remount such safety flags, conventional whip mount designs require removing the ½ inch nut and mounting bolt from the ATV and cutting off the shattered whip shards with a knife or other cutting utensil and forcing the broken butt section out of the mounting bolt. Once trimmed, the whip is then forced back into the mounting hole; often a tight fit and sometimes only possible with the use of a hammer or other tools not easily carried on an ATV.

BRIEF SUMMARY

An offroad whip mount as disclosed below includes a mounting element that may be secured to a standard mounting location on any suitable vehicle. A closure plate is secured to the mounting element using a tongue, sized and dimensioned to engage a corresponding groove in the mounting element and the closure plate is secured to the mounting element with a threaded fastener. The mounting element and the closure plate each have two corresponding half-cylindrical grooves that form two independent whip receptacles. The engaging tongue and groove combined with the threaded fastener serve to clamp one or two whips into the whip mount.

The offroad whip mount enables a rider with a broken whip to open the whip mount with a standard wrench and remount a broken whip without the need to trim the broken end. Designed with elements that can open and close tightly around a new or broken whip via a single threaded fastener and a corresponding tongue and groove feature, the offroad whip mount simplifies the flag mounting process by requiring fewer steps and needed tools; it also decreases the time needed to mount a safety flag to an ATV. The offroad whip mount includes parallel channels to accommodate the two most popular sizes of whips sold; ¼ inch and 5/16 inch.

An offroad whip mount can easily accept damaged and frayed whip ends which are accommodated in a cavity in the base of the mounting element and a corresponding cavity in the closure plate that provides space within the whip mount to accommodate uneven and or frayed ends. This cavity is especially valuable when, due to an accident or other incident, a flag whip breaks and the rider is without the proper cutting utensil to correctly trim and remount it.

Another process that the offroad whip mount simplifies is the removal of the broken whip section that is often stuck within the whip mount after an accident. Conventional whip mounts require the broken butt section to be punched out with tools such as a hammer and punch. The butt end of a broken whip may be removed from an offroad whip mount by removing the threaded fastener and separating the closure plate from the mounting element. The broken butt section is easily removed by hand. The offroad whip mount can accommodate up to two whips simultaneously. In the event that the rider or a fellow ATV rider loses or damages a whip beyond repair, a spare is available.

As ATVs make up a majority of the OHV market, all references made in referring to ATVs will generally apply to all off highway vehicles having two, three, four or more wheels including motorcycles. Any suitable mechanism for achieving clamping force between the closure plate and the mounting element may be used, such as a threaded bolt or screw, or a cam lock mechanism.

BRIEF DESCRIPTION OF THE DRAWINGS

FIG. 2 is a side view of an offroad whip mount.

FIG. 3 is a side view of the whip mount of FIG. 2 with closure plate open.

FIG. 4 is a perspective view of the mounting element of the whip mount of FIG. 2.

FIG. 5 is a perspective view of the closure plate of the whip mount of FIG. 2.

FIG. 5A is a perspective view of an alternate tab configuration for a closure plate.

DETAILED DESCRIPTION

Figure 1:
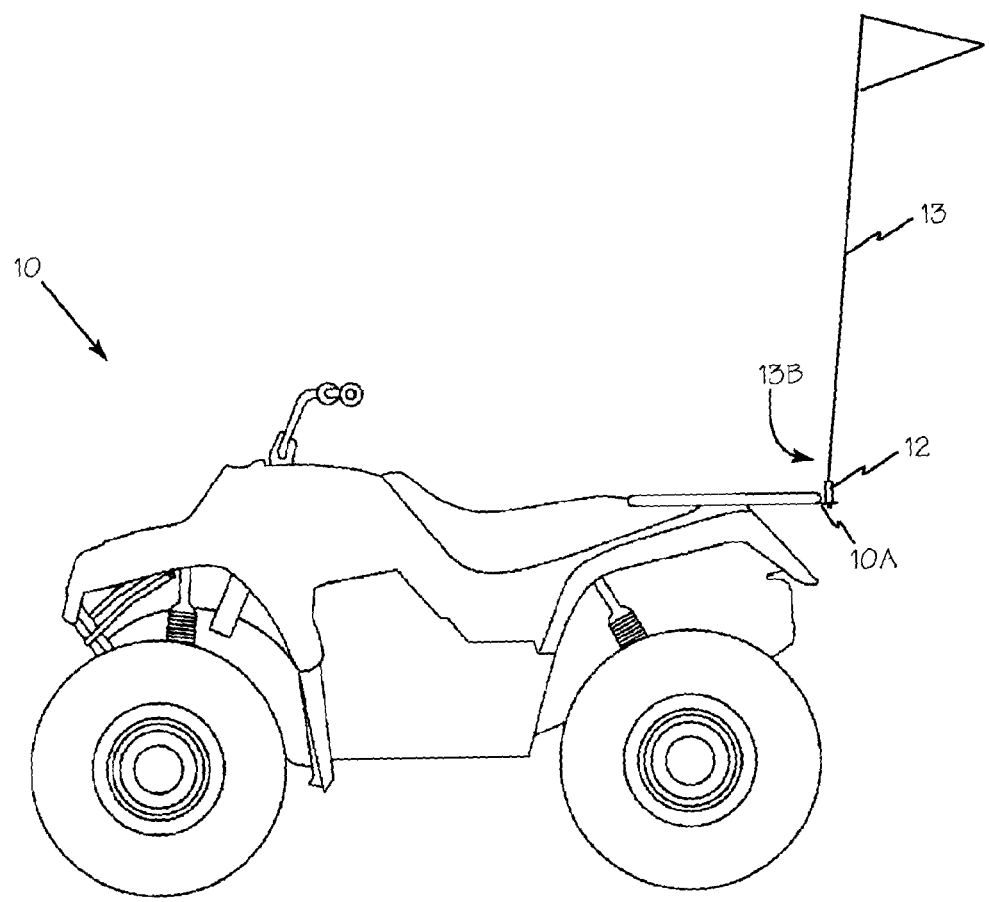
FIG. 1 is a side view of an ATV with an offroad whip mount.

ATV 10 of FIG. 1 includes offroad whip mount 12 for securing whip 13 to the ATV. Whip 13 is generally cylindrical and formed of any suitable material such as metal, wood, fiberglass, graphite or any suitable combination. Butt end 13B is secured in whip mount 12 which is secured to any suitable component of an offroad vehicle such as mounting tab 10A.

Offroad whip mount 12 of FIGS. 2 and 3 includes mounting element 15 and closure plate 16 secured together by fastener 17 and the engagement between tab, tang or tongue 16A and slot or groove 15S. Mounting element 15 is generally L-shaped as shown in the side view of FIG. 2. Mounting element 15 includes base portion 15B as the foot of the L and engagement portion 15A as the vertical portion of the L. Lower surface 15L of base 15B may be secured to any suitable vehicle using mounting fastener 18 extending into base 15B or a mounting element such as threaded stud 19 may be included into base 15B to engage a corresponding nut.

Whip mount 12 includes two channels, channels 20 and 21 for engaging the butt end of a whip to be mounted. Channel 20 is sized to frictionally engage whips having a butt diameter of 5/16 inch, and channel 21 is sized to frictionally engage whips having a butt diameter of 1/4 inch. Fastener 17 engages threaded bore 14 in mounting element 15 and may be any suitable releasable fastener such as a bolt or screw or a quick release mechanism such as a cam lock.

Referring now to FIG. 4, mounting element 15 includes slot or groove 15S formed in upper surface 22 of base 15B. Slot 15S is parallel to face 23 of engagement portion 15A. First cavity 24A is formed in engagement portion 15A to accommodate broken or splintered portions of the butt end of a whip that had been broken. Two semi-cylindrical channels, channel 20A and channel 21A are formed in face 23 and extend from top 15T into cavity 24. Threaded bore 14 may include a malleable insert such as insert 14A to reduce the likelihood of vibration loosening of fastener 17. Insert 14A may be formed of any suitable material such as Teflon®.

Referring now to FIG. 5, closure plate 16 includes top surface 16T, bottom surface 16B, inner surface 16X and outer surface 16Y. Tongue 16A extends from bottom surface 16B and is sized and dimensioned to removably engage groove 15S. Second cavity 24B is formed in inner surface 16X to accommodate broken or splintered portions of the butt end of a whip that had been broken. Two semi-cylindrical channels, channel 20B and channel 21B are formed in inner surface 16X and extend from top surface 16T into cavity 24B. When closure plate 16 is secured to mounting element 15 semi-cylindrical channels 20A and 20B form cylindrical channel 20 and semi-cylindrical channels 21A and 21B form cylindrical channel 21. Fastener bore 11 extends through closure plate 16 from inner surface 16X to outer surface 16Y to permit fastener 17 to engage threaded bore 14.

In use, whip mount 12 is secured to a vehicle such as ATV 10. Fastener 17 is loosened allowing closure plate 16 to be separated from mounting element 15 as illustrated in FIG. 3. Butt end 13B of a whip is inserted into an appropriately sized channel between closure plate 16 and mounting element 15 with tongue 16A engaging slot 15S and fastener 17 tightened to maintain the relative positions of the elements and secure the whip. If a whip is broken, fastener 17 is loosened allowing closure plate 16 to be separated from mounting element 15. The broken stub of the whip is removed from the whip mount. The broken end of the whip is placed into the appropriately sized channel between closure plate 16 and mounting element 15 with the splintered end of the whip extending into cavity 24 formed by first cavity 24A and second cavity 24B.

Referring now to FIG. 5A, closure plate 26 may include one or more tabs such as tabs 27A and 27B.

Figure 6:
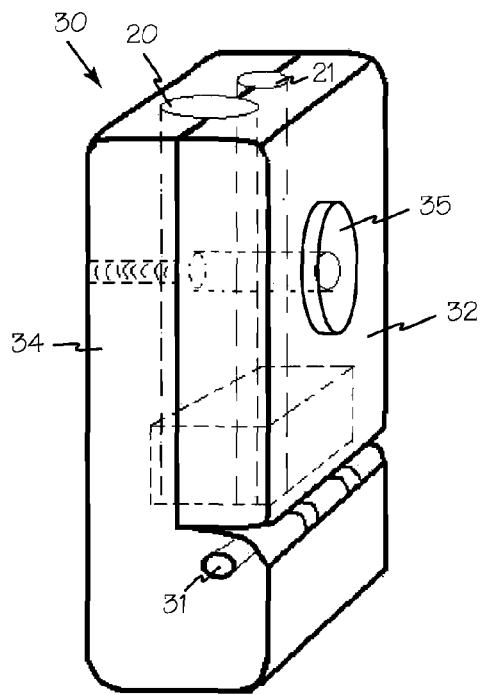
FIG. 6 is a perspective view of an alternate offroad whip mount with a hinged closure plate.

Referring now to FIG. 6, whip mount 30 includes hinge 31 securing the bottom of closure plate 32 to mounting element 34. Releasable fastener 35 is a cam lock.

Figure 7:
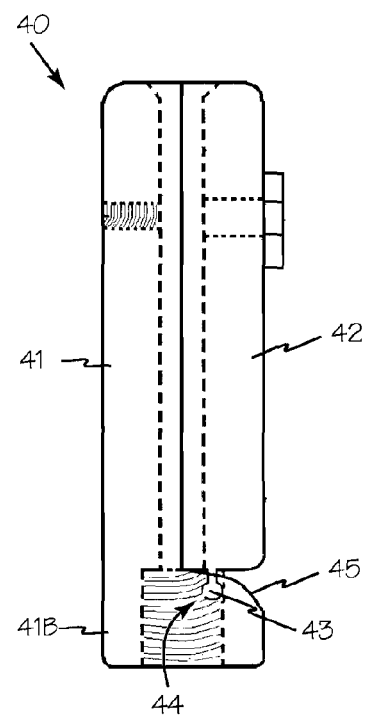
FIG. 7 is a side view of another alternate offroad whip mount with a rounded tongue.

Referring now to FIG. 7, whip mount 40 includes mounting element 41 and closure plate 42. Tab or tongue 43 is rounded to enable rotation of closure plate 42 about tongue 43 without disengaging tongue 43 from slot 44 in upper surface 45 of base 41B. Upper surface 45 may also be radiused to further enable rotation of closure plate 42 about tongue 43.

Figure 8:
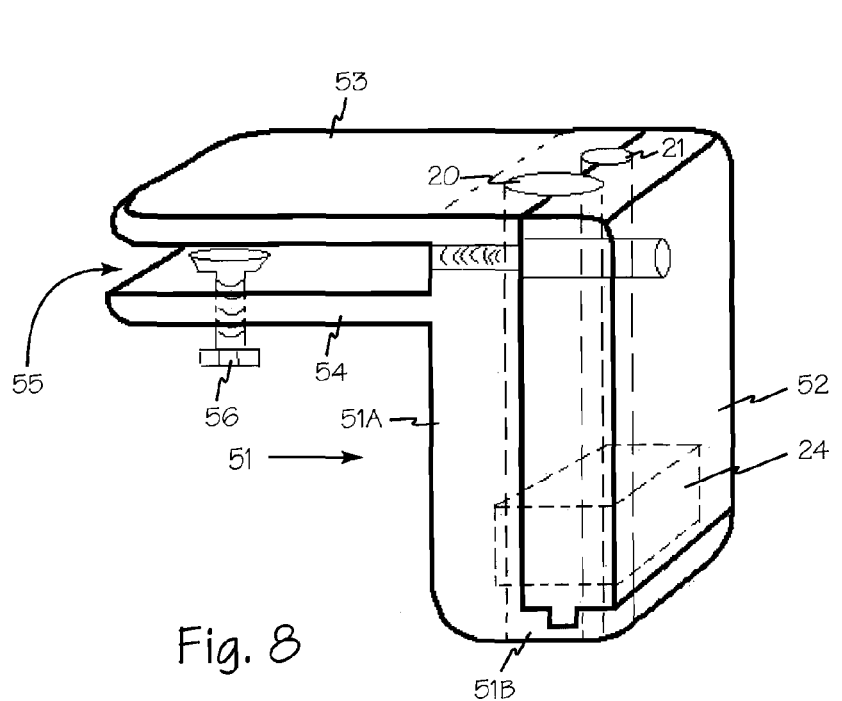
FIG. 8 is a perspective view of an offroad whip mount for mounting on a bumper or fender.

Referring now to FIG. 8, offroad whip mount 50 is configured to mount to vehicles without using a conventional whip mounting bracket. Mounting element 51 is configured with first portion 51A and base 51B for engaging closure plate 52 to form parallel whip mounting channels 20 and 21 which extend into cavity 24 as discussed above. Upper portion 51A includes upper mounting arm 53 and lower mounting arm 54 extending perpendicular to upper portion 51A. The relative orientation of upper mounting arm 53 and lower mounting arm 54 creates channel 55 for engaging any generally planar element of a vehicle, such as a fender or bumper, which may be used for securing offroad whip mount 50. Any suitable means of engaging the planar vehicle element such as clamp 56 may be used.

Figure 9:
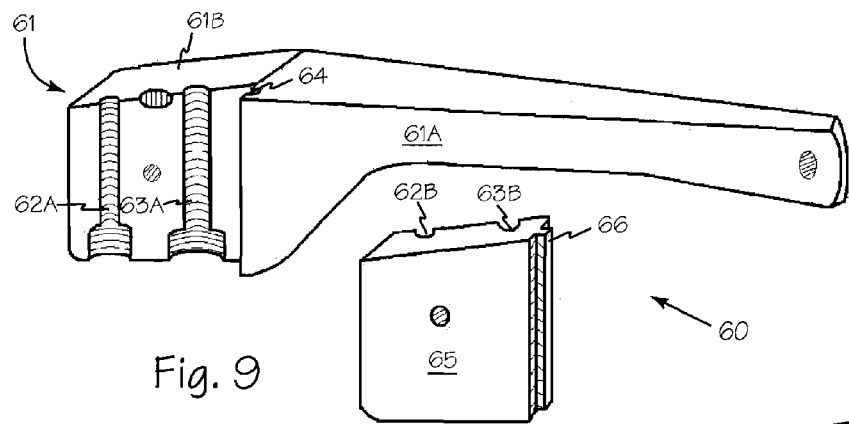
FIG. 9 is a perspective view of an offroad whip mount for securing on a motorcycle.

Referring now to FIG. 9, offroad whip mount 60 is configured for motorcycles. Mounting element 61 includes base 61B and first portion 61A oriented for generally horizontal mounting. First channel 62A and second channel 63A are formed in base 61B, and groove 64 is formed in first portion 61A with groove 64 being parallel to first and second channels 62A and 63A. Closure plate 65 is formed with first channel 62B and second channel 63B formed parallel to tongue 66.

Figure 10:
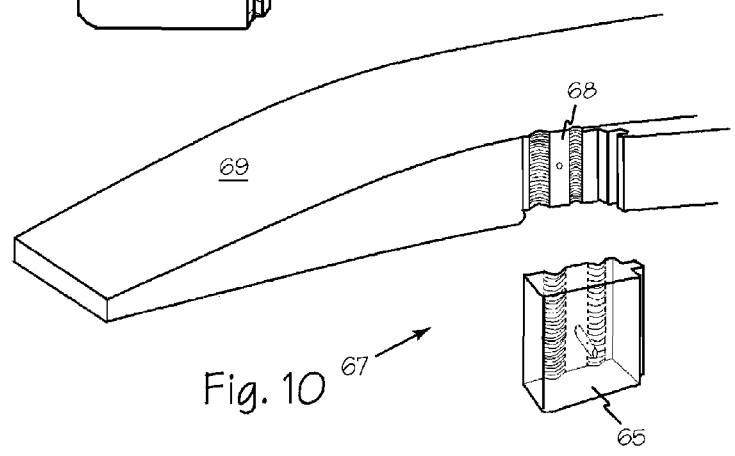
FIG. 10 is a perspective view of an offroad whip mount incorporated into a motorcycle fender.

Referring now to FIG. 10, motorcycle fender whip mount 67 is formed with mounting element 68 integrated into fender 69.

Figure 11:
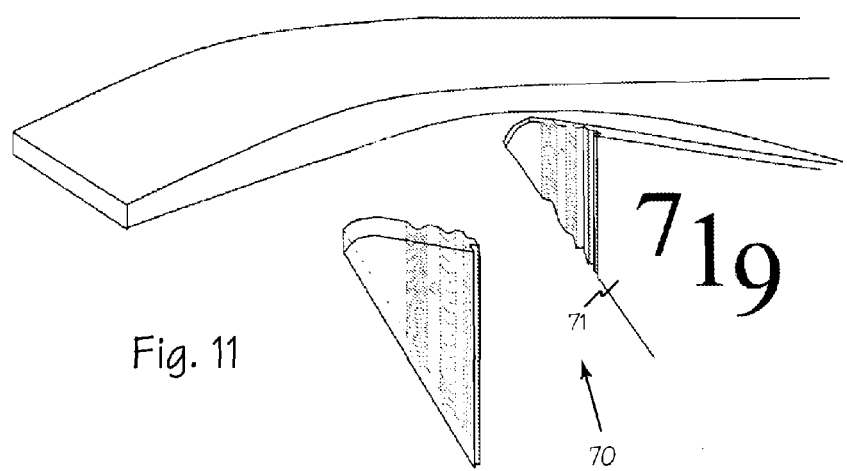
FIG. 11 is a perspective view of an offroad whip mount incorporated into a side guard plate of a motorcycle.

Referring now to FIG. 11, offroad whip mount 70 may be integrated into side guard plate 71 of a motorcycle.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. An apparatus for securing a whip to a vehicle comprising:

a mounting element having a top surface and an L-shaped profile with a base as the foot of the L and an engagement portion as the vertical element of the L extending from the base to the top surface, the base having an upper surface and a lower surface and including a groove in the upper surface, the engagement portion having a face with a first cavity extending into the face and two parallel semi-cylindrical channels extending into the face from the top surface to the first cavity to place the two parallel semicylindrical channels in communication with the first cavity, the mounting element also including a threaded bore extending into the engagement portion;

a closure plate having a top, a bottom, an outer surface, an engagement face and a tongue extending from the bottom of the closure plate, the tongue sized and dimensioned to engage the groove in the base, the engagement face including a second cavity extending into the closure plate and two parallel semicylindrical channels extending from the top to the second cavity to place the two parallel semicylindrical channels in communication with the second cavity, the second cavity corresponding to the first cavity in the face of the mounting element such that when the closure plate is secured to the mounting element the first cavity and the second cavity align to form an interior space to accommodate a broken butt end of a whip, and the semi-cylindrical channels in the closure plate align with the semi-cylindrical channels in the mounting element to form cylindrical channels sized and dimensioned to frictionally engage a whip;

a mounting fastener for securing the mounting element to a vehicle, the mounting fastener engaging the lower surface of the base; and a fastener for releasably securing the closure plate to the mounting element.

2. The apparatus of claim 1 wherein the fastener is a bolt.

3. The apparatus of claim 1 wherein the fastener is a cam lock.

4. The apparatus of claim 1 further comprising a vibration resistant insert in the threaded bore.

5. The apparatus of claim 1 further comprising a hinge secured between the bottom surface of the closure plate and the base of the mounting element.

6. The apparatus of claim 1 wherein the mounting fastener is a 15 bolt.

7. The apparatus of claim 1 wherein the mounting fastener is a threaded stud extending from the base.

8. The apparatus of claim 1, wherein the first cavity is positioned between the base and the two parallel semicylindrical channels.

9. The apparatus of claim 1, wherein the closure plate and the mounting element are moveable relative to each other when engaged to vary the magnitude of the frictional engagement with the whip.

10. The apparatus of claim 1, wherein the base is integral with the engagement portion of the mounting element.

11. The apparatus of claim 1, wherein the groove formed in the upper surface of the base extends in a perpendicular direction to the two semicylindrical channels formed in the mounting element.

* * * * *